US008874759B2

(12) United States Patent
Zave et al.

(10) Patent No.: US 8,874,759 B2
(45) **Date of Patent: *Oct. 28, 2014**

(54) METHOD AND APPARATUS FOR PROGRAMMING SESSION INITIATION PROTOCOL BACK-TO-BACK USER AGENTS

(75) Inventors: Pamela Zave, Chatham, NJ (US); Gregory W. Bond, Hoboken, NJ (US); Eric Cheung, New York, NY (US); Thomas M. Smith, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,925

(22) Filed: Aug. 20, 2012

(65) Prior Publication Data

US 2012/0314702 A1 Dec. 13, 2012

Related U.S. Application Data

(63) Continuation of application No. 12/625,270, filed on Nov. 24, 2009, now Pat. No. 8,250,216.

(51) Int. Cl.
*G06F 15/16* (2006.01)
*G06F 9/44* (2006.01)

(52) U.S. Cl.
CPC .................................... *G06F 8/30* (2013.01)
USPC ........... 709/227; 709/203; 370/401; 370/325; 370/326; 370/356; 717/101; 717/135; 717/173

(58) Field of Classification Search
USPC .................. 709/203, 227; 370/401, 325–356; 717/101, 135, 173
See application file for complete search history.

(56) References Cited

U.S. PATENT DOCUMENTS

| | | | | |
|---|---|---|---|---|
| 7,688,960 | B1 | 3/2010 | Aubuchon et al. | |
| 8,250,216 | B2 | 8/2012 | Zave et al. | |
| 2003/0177124 | A1 | 9/2003 | Sauri | |
| 2004/0261065 | A1 | 12/2004 | Abrams et al. | |
| 2006/0268858 | A1* | 11/2006 | Hagale et al. | 370/389 |
| 2007/0268930 | A1* | 11/2007 | Bond et al. | 370/467 |
| 2008/0080525 | A1* | 4/2008 | Chatilov et al. | 370/401 |
| 2009/0024650 | A1 | 1/2009 | Kamani et al. | |
| 2009/0132220 | A1* | 5/2009 | Chakraborty et al. | 703/13 |
| 2010/0165979 | A1* | 7/2010 | Cheung et al. | 370/352 |
| 2011/0010159 | A1* | 1/2011 | Birch et al. | 703/21 |
| 2011/0066694 | A1* | 3/2011 | Barrett et al. | 709/207 |

OTHER PUBLICATIONS

Back-To-Back User Agent (B2BUA) SIP Servers Powering Next Generation Networks, by Radvision, 2007, pp. 1-30.
Implementing a SIP Back-To-Back User Agent using javax.servlet.sip.B2buaHelper, by Bhavanishankar, Aug. 15, 2008, pp. 1-4.
Distributed Feature Composition, by Michael Jackson and Pamela Zave, 2002, pp. 1-2.

* cited by examiner

*Primary Examiner* — Hitesh Patel

(57) ABSTRACT

In one embodiment, the present disclosure is a method and apparatus for programming session initiation protocol back-to-back user agents. In one embodiment, a method for programming a telecommunication feature as a session initiation protocol back-to-back user agent includes receiving source code defining the feature, the source code using at least one abstraction that hides session initiation protocol signaling details required by the feature and generating executable code that causes a session initiation protocol server to execute the feature, in accordance with the abstractions.

17 Claims, 9 Drawing Sheets

SOURCE CODE 302
rcv(c) / t = ctu(c)
SettingUp c <-> t
succeeded(t) / ui!Talking(t.src)
Talking c <-> t
ui?Resume / end(e)
ui?Consult / e = rev(t,dest=expertAddr)
ended(e)
Consulting c, e <-> t
ended(c) / ui!Abandoned
ended(t)
ui?Transfer / end(t)
Abandoned e <-> t
Transferred c <-> e
COMPILER 300
COMPILED PROGRAM 304

METHOD AND APPARATUS FOR PROGRAMMING SESSION INITIATION PROTOCOL BACK-TO-BACK USER AGENTS

This application is a continuation of U.S. patent application Ser. No. 12/625,270, filed Nov. 24, 2009, now U.S. Pat. No. 8,250,216, issued Aug. 21, 2012, and is herein incorporated by reference in its entirety.

FIELD OF THE DISCLOSURE

The present disclosure relates generally to session initiation protocol (SIP) technology and relates more particularly to methods for programming SIP back-to-back user agents.

BACKGROUND

In SIP, certain actions such as initiating and terminating calls can only be performed by user agents, which are usually SIP clients running on endpoint devices. FIG. 1 is a schematic diagram illustrating an exemplary back-to-back user agent 100, which is a software process that contains two or more user agents back-to-back (e.g., a server side user agent and a client side user agent). As illustrated, a back-to-back user agent is often hosted by an application server in the signaling path between endpoints.

Back-to-back user agents designed and composed according to the Distributed Feature Composition (DFC) architecture can be used to implement SIP-based telecommunication services in a way that is both modular and compositional. However, SIP programmers tend to avoid back-to-back user agents for several reasons, including the fact that back-to-back user agents are inherently complex and difficult to program.

SUMMARY

In one embodiment, the present disclosure is a method and apparatus for programming session initiation protocol back-to-back user agents. In one embodiment, a method for programming a telecommunication feature as a session initiation protocol back-to-back user agent includes receiving source code defining the feature, the source code using at least one abstraction that hides session initiation protocol signaling details required by the feature and generating executable code that causes a session initiation protocol server to execute the feature, in accordance with the abstractions.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for programming session initiation protocol (SIP) back-to-back user agents. Embodiments of the disclosure facilitate programming of advanced features including switching, controlling multiple parties, controlling media and multimedia, and composing independently developed features at runtime. In one embodiment, the present disclosure employs abstractions in source code that hide most of the details of SIP signaling, so that programming of back-to-back user agents becomes a relatively easy task even for programmers without deep knowledge of SIP or Voice over Internet Protocol (VoIP) technology. These abstractions are designed to preserve correct end-to-end behavior of SIP signaling.

Two goals of the present disclosure are modularity and composition. Modularity is achieved when a feature (i.e., any increment of functionality that modifies or enhances basic connection service between two telecommunication endpoints) can be designed and implemented independently of all other features, and when features can be added to or deleted from a system without changing other features. Composition is achieved when all of the features applicable in a situation work properly in a cooperative and synergistic manner. In order to achieve these goals, some embodiments of a back-to-back user agent of the present disclosure approximate Distributed Feature Composition (DFC) feature boxes. In further embodiments, the disclosure employs embedded JAVA programming language syntax for access to JAVA programming language data structures and application programming interfaces (APIs).

Figure 1:
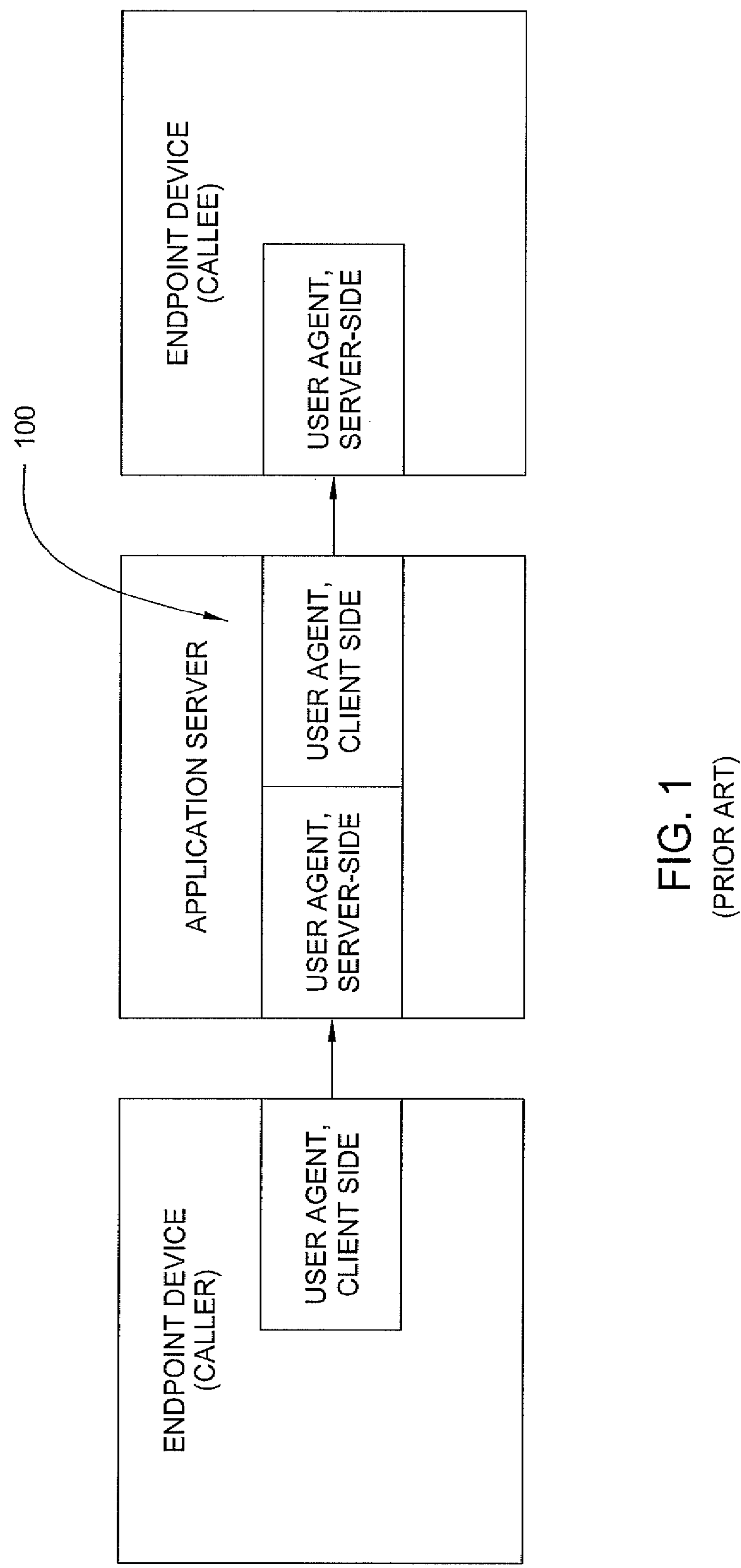
FIG. 1 is a schematic diagram illustrating an exemplary back-to-back user agent.
Figure 2:
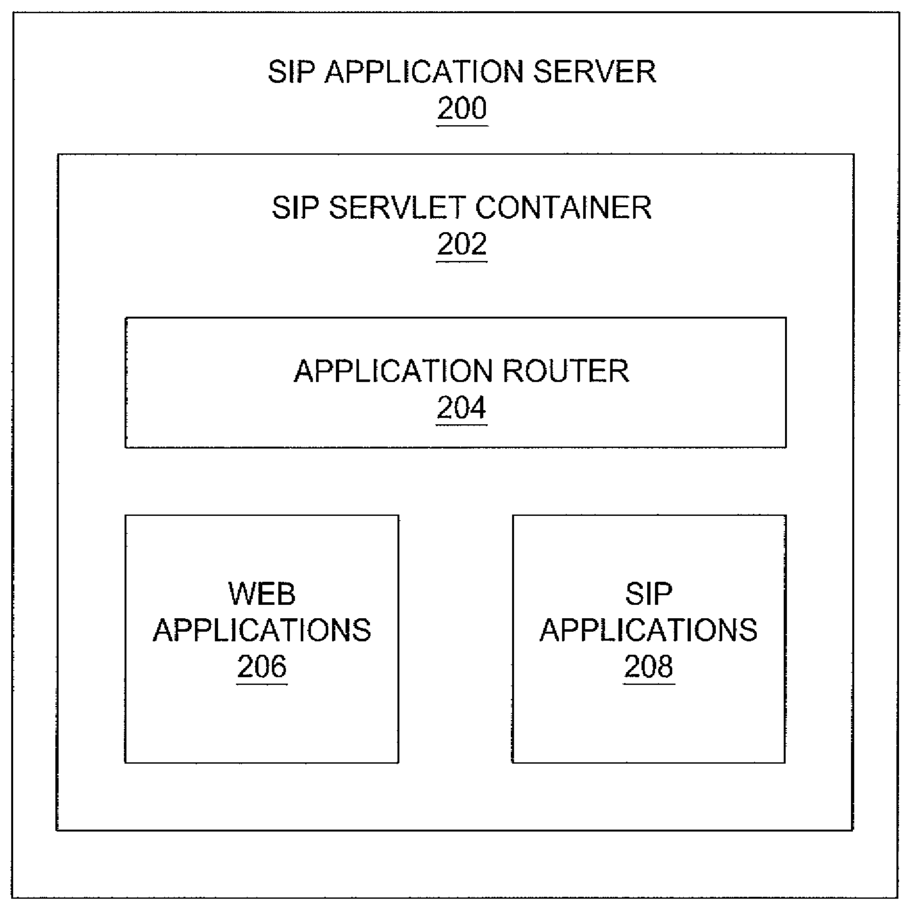
FIG. 2 is a block diagram illustrating one embodiment of a SIP application server, according to the present disclosure.

FIG. 2 is a block diagram illustrating one embodiment of a SIP application server 200, according to the present disclosure. The SIP application server 200 represents an exemplary implementation of a runtime environment of a back-to-back user agent programmed according to the present disclosure. For example, the SIP application server 200 may operate in a manner similar to the application server illustrated in FIG. 1.

As illustrated, the SIP application server 200 comprises at least one SIP servlet container 202. The SIP servlet container 202 is an application server that runs SIP, hypertext transfer protocol (HTTP), and converged applications. The SIP servlet container 202 can run in a network or in an endpoint.

The SIP servlet container 202 further comprises an application router 204, web applications 206, and SIP applications 208. In one embodiment, the application router 204 is a DFC application router.

The SIP applications 208 comprise programs for SIP features. One or more of the SIP programs defines a SIP back-to-back user agent. Each SIP application generated according to the present disclosure runs as a SIP servlet. In one embodiment, the SIP applications 208 are written in the JAVA programming language.

Figure 3:
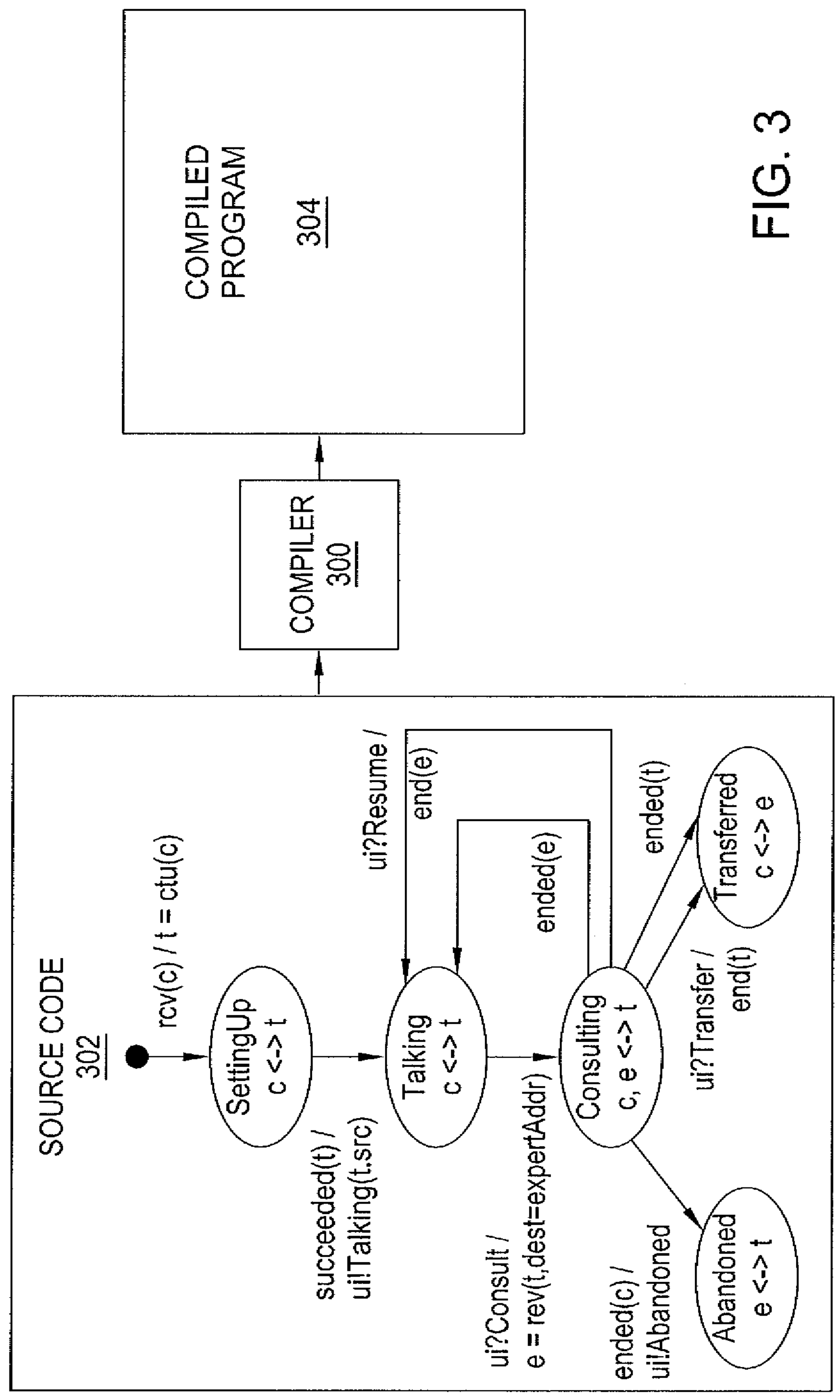
FIG. 3 is a block diagram illustrating an exemplary compiler, according to embodiments of the present disclosure.

FIG. 3 is a block diagram illustrating an exemplary compiler 300, according to embodiments of the present disclosure. The compiler 300 is configured for generating executable code that runs on a SIP servlet container (e.g., such as SIP servlet container 202). As illustrated, the compiler 300 receives source code 302 that defines a feature. In the embodiment illustrated in FIG. 3, the exemplary source code 302 defines an Attended Transfer feature that enables a trainee agent in a customer service center to transfer a customer call to a more experienced agent. As discussed in further detail below, this source code 302 comprises one or more functional steps expressed using one or more abstractions. The abstractions hide all or most of the details of SIP signaling. Although these behaviors are transparent at the level of the abstractions, they are often far from transparent at the level of the SIP implementation. In one embodiment, the abstractions are adapted from the DFC architecture. In one embodiment, the abstractions require only messages used in the general SIP standard Request for Comments (RFC) 3261. In a further embodiment, the abstractions handle additional message types as well.

The compiler 300 generates executable code (i.e., a program 304) in accordance with the abstractions in the source code 302. In one embodiment, the source code 302 semantically is a sequential, deterministic finite state machine. The executable code comprises a program 304 that causes a SIP application server to execute the feature defined by the source code 302. In one embodiment, the program 304 is written in the JAVA programming language. In the illustrated embodiment, the program 304 defines a SIP back-to-back user agent that enables an Attended Transfer feature.

Figure 4:
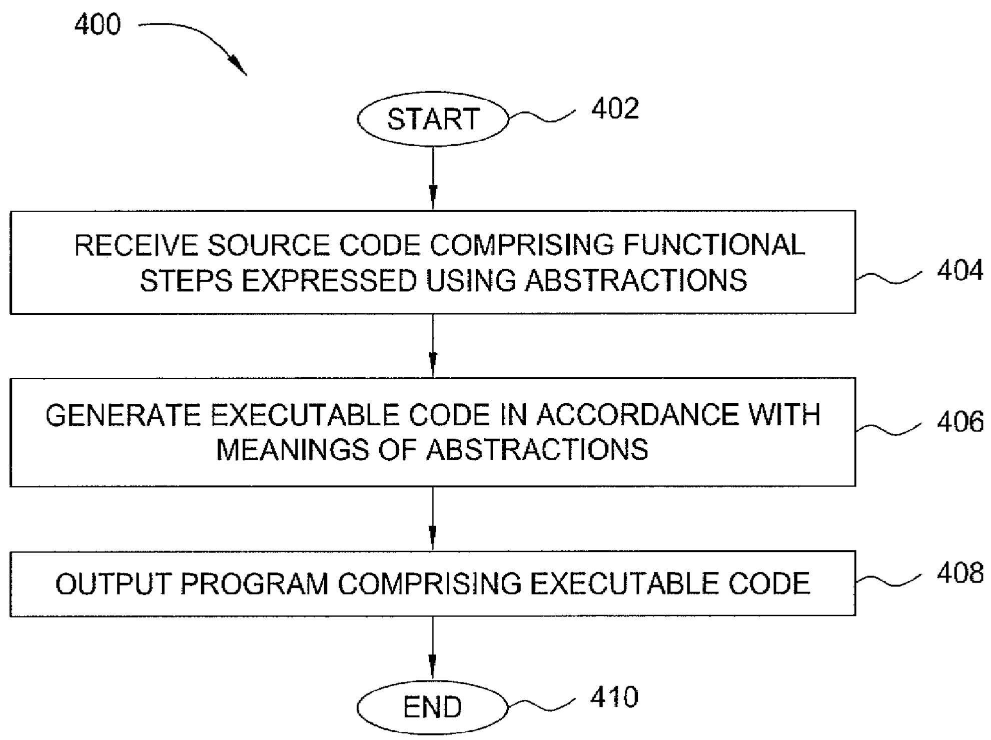
FIG. 4 is a flow diagram illustrating one embodiment of a method for programming SIP back-to-back user agents, according to the present disclosure.

FIG. 4 is a flow diagram illustrating one embodiment of a method 400 for programming SIP back-to-back user agents, according to the present disclosure. The method 400 may be implemented, for example as the compiler 300 illustrated in FIG. 3.

The method 400 is initialized at step 402 and proceeds to step 404, where the compiler 300 receives source code for a back-to-back user agent feature. The source code comprises one or more functional steps expressed using one or more abstractions. As discussed above, the abstractions hide all or most of the details of SIP signaling. In one embodiment, the abstractions are adapted from the DFC architecture. In one embodiment, the abstractions require only messages used in the general SIP standard Request for Comments (RFC) 3261. In a further embodiment, the abstractions handle additional message types as well.

In step 404, the compiler 300 generates executable code in accordance with the meanings of the abstractions in the source code. The executable code comprises a program that defines a SIP back-to-back user agent programmed to enable a particular feature. In other words, the program causes specified behavior in the SIP back-to-back user agent (e.g., the performance of actions that enable a certain feature, where some of these actions may have been hidden by the abstractions). In one embodiment, the program semantically is a sequential, deterministic finite state machine. In one embodiment, the program is written in the JAVA programming language.

The compiler 300 outputs the program (e.g., to an application server or a SIP servlet container) in step 408 before the method 400 terminates in step 410.

As discussed above, embodiments of the disclosure rely on abstractions that hide all or most of the details of SIP signaling. In one embodiment, four principle abstractions are implemented. First, the source code views the program defining a back-to-back user agent as a finite state machine. Second, the creation and destruction of active SIP dialogs is performed by primitives that appear atomic from the perspective of a programmer. Third, correct media control is treated as a composition of the states and goals of all of the features in a signaling path. Fourth, "invite" and "re-invite" transactions are used for all media control, including early media. An additional abstraction allows programs to directly manipulate status messages and to deal with the status messages implicitly.

According to the first principle abstraction, embodiments of the present disclosure view the program that defines a back-to-back user agent as a finite state machine. In one embodiment, the finite state machine includes guards that label each explicit state transition. State transitions are then executed if the associated guards evaluate to true. The program implementation has an input queue for each established invite dialog, and one input queue for incoming invite messages that establish new dialogs. The cycle defined by this finite state machine automatically renders the program as input-enabled, meaning that whenever a SIP input message is received by the back-to-back user agent, the behavior of the back-to-back user agent in response to the message is well-defined. The back-to-back user agent can also read and process any message from any input queue at any time.

According to the second principle abstraction, the creation and destruction of active SIP dialogs is performed by primitives that appear atomic from the perspective of a programmer. From the perspective of a program generated in accordance with the present disclosure, an "active" dialog is an invite dialog that exists and can be observed and directly manipulated by the program. In its initial state, the program has no active dialogs.

An active dialog always begins when the program sends or receives an initial invite message. The program receives an invite message through the guard "rcv(dialog1)," which becomes true only when the invite message arrives. The unique identifier of the active dialog is assigned to the dialog variable "dialog1," where the identifier acts as a pointer to the active dialog. The program sends an invite message through an action such as "dialog2=new(dest)" or "dialog2=ctu(dialog1)." In both cases, "dialog2" is the unique variable for the new active dialog. The operation names "new" and "ctu" refer, respectively, to the new and continued methods of the routing algorithm used to create the invite message. The method ensures that the invite message is correctly formed for the application router (e.g., application router 204 of FIG. 2). The argument "dest" is the destination address (e.g., SIP request uniform resource identifier) in the invite resulting from the new action. The argument "dialog1" is the variable pointing to the active dialog whose invite is continued to make the invite resulting from the continue action. At all times, the source (SIP From) and destination addresses of the invite that began an active dialog can be referred to as "dialog.src" and "dialog.dest," respectively.

Referring, for example, to the exemplary program 302 illustrated in FIG. 3, the program 302 begins with a transition labeled by the guard "rcv(c)/t=ctu(c)," where "c" points to the dialog from the customer and "t" points to the dialog from the trainee. This transition ends in the stable state annotated with the dialog variables "c" and "t." In one embodiment of the present disclosure, every stable state is annotated with the variables pointing to the dialogs that are active in that state. This enables a programmer to remember which dialogs are active in any state.

In addition to the "rcv," "new," and "ctu" operations, an active dialog can also be created using the "rev" operation for reverse. Reverse is a routing method similar to continue, except that reverse is used when the new dialog has reversed roles with respect to the dialog from which the new dialog is derived. For example, in the exemplary program 302, the dialog to the consulting expert is derived from "t" with reverse. In "t," the trainee is the destination of the dialog, while in "c," the trainee is the source of the dialog.

The four operations that create active dialogs (i.e., "rcv," "new," "ctu," and "rev") all appear to be atomic and instantaneous from the perspective of a programmer. For instance, the implementation of "rcv" immediately replies with a "183" message to establish the dialog, and does not wait while the final response to the received "invite" is being determined (the final response is handled by other operations). The implementations of the dialog-initiating operations (i.e., "new," "ctu," and "rev") also send the "invite," but do not wait for a final response. Atomic, instantaneous operations such as these keep programming simple, because the programmer does not need to think about concurrency.

The operations that destroy active dialogs are also atomic and instantaneous from the perspective of the programmer. The guard "ended(dialog1)" becomes true when the implementation receives a message indicating that the other end of "dialog1" wants the dialog to end. Depending on the SIP state of the dialog, this might be a "cancel" or a "bye" request, or any failing final response to the initial "invite." If "ended (dialog1)" is followed by a predicate such as "[BusyHere]," then the entire guard becomes true only if the received message is the matching SIP final response "486". The implementation automatically generates any required response to the message that makes "ended" true (e.g., "200 OK" in response to a "bye" request).

To end an active dialog, a programmer uses the action "end(dialog1). Depending on the SIP state of the dialog, this might be a "cancel" or a "bye" request, or any failing final response to the initial "invite." If "ended(dialog1)" is followed by a message modifier such as "[Unauthorized]," and if the action is implemented by sending a final response, then the final response is selected by the message modifier "401." If a failing response must be sent, and there is no message modifier, the default message type is "486."

After an "ended" guard or "end" action, the dialog is no longer active and can no longer be manipulated. Implementations of the present disclosure automatically handle any cleanup messages.

In further embodiments, the present disclosure includes some implicit transitions and actions that end active dialogs as further programming conveniences. In a first embodiment, if a program for a bound feature box (i.e., a feature box in which, for each address subscribing to the feature box type, there is at most one instance of that box type at any time) has a stable state with no out-transition guarded by "rcv," then that state has an implicit self-transition "rcv(unwanted)/end(unwanted)." Without this implicit transition, which rejects unwanted dialogs, the program would not be input-enabled.

In a second embodiment, if a stable state with active dialog "dialog1" has no out-transition guarded by "ended(dialog1)," then the state has an implicit transition with this guard, entering the distinguished terminal state in which the program has terminated.

In a third embodiment, the terminal state has no active dialogs. If a transition enters the terminal state, then the transition has implicit actions that end all remaining active dialogs. Because of the second and third embodiments described for implicit transitions, the Attended Transfer program, for example, needs no explicit transitions out of the Abandoned, Transferred, and Post-mortem states.

Figure 5:
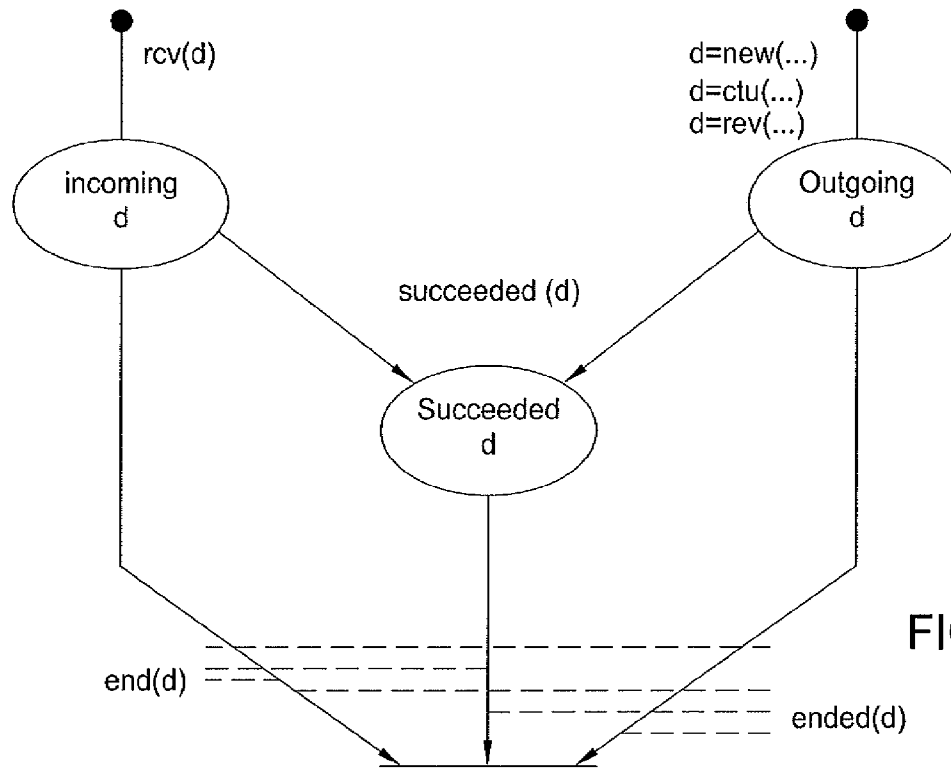
FIG. 5 is a diagram illustrating the major dialog states in a program generated according to embodiments of the present disclosure, along with the guards and actions that cause the state transitions.

FIG. 5 is a diagram illustrating the major dialog states in a program generated according to embodiments of the present disclosure, along with the guards and actions that cause the state transitions. As illustrated, the guard "succeeded(dialog1)" is satisfied by the received message first indicating that there has been success in reaching the desired party. Commonly, the message that makes "succeeded" true of an outgoing dialog is "200 OK" in response to the initial "invite." According to embodiments of the present disclosure, incoming dialogs can also become "succeeded," and messages other than "200 OK" can cause the state transition. These variations are discussed in further detail below in connection with the third and fourth principle abstractions.

In the exemplary Attended Transfer program, a transition guarded by "succeeded (t)" indicates that the trainee is currently talking to the customer. The transition sends a message to the trainee's user interface (e.g., a Web application). On receiving this message, the application displays a "Consult" button for the trainee to click when needed.

In the exemplary Attended Transfer program, "ui" is a non-SIP message port allowing communication between the feature and its Web user interface. A program can have any number of non-SIP message ports, which look and act like active dialogs except that they are neither created nor destroyed by dialog operations. The Attended Transfer program also informs the user interface when it enters the "Abandoned" state. The messages "Consult," "Resume," and "Transfer" are sent by the user interface because of, for example mouse clicks in the trainee's browser.

Whenever a dialog is active, it is possible to send and receive miscellaneous messages through the dialog, using the syntaxes "dialog1 ! messageType" and "dialog1 ? messageType," respectively.

According to the third principle abstraction, correct media control is treated as a composition of the states and goals of all of the features in a signaling path. The state annotations in a program generated according to the present disclosure control media channels. If a state is annotated "dialog1<->dialog2," which is referred to as a link between the active dialogs, then the implementation of the program attempts to create a media connection between the endpoint devices to which "dialog1" and "dialog2" lead. If a state annotation contains "dialog3" standing alone, then the implementation of the program attempts to put media at the endpoint device to which "dialog3" leads on hold. Holding means that a media connection is established or not, according to the choice made by the endpoint device, but even if a connection is established, no actual media packets are being transmitted.

Embodiments of the present invention assume that a SIP message contains at most one session descriptor. Descriptors are treated as wholes, so a media connection between endpoints might include multiple channels transmitting several different media.

Since no feature has unilateral control over media connections, implementation of a program generated according to the present disclosure attempts to produce the desired media state. As discussed above, the present disclosure treats correct media control as a composition of the states and goals of all of the features in a signaling path.

FIGS. 6A-6D are diagrams illustrating the composition of media control in exemplary Attended Transfer (AT) and Trainee Monitoring (TM) programs. The Attended Transfer program has been discussed above. The Trainee Monitoring program allows the supervisor (S) of a trainee agent to listen to the trainee's conversations and whisper advice. FIGS. 6A-6D are arranged in the order in which the illustrated events occur.

Figure 6B:
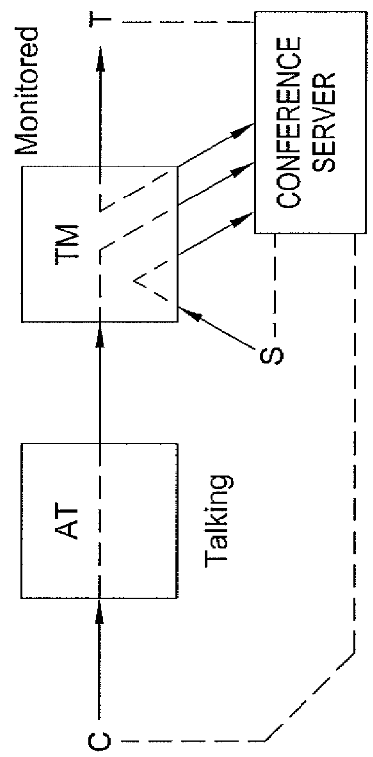
FIGS. 6A-6D are diagrams illustrating the composition of media control in exemplary Attended Transfer and Trainee Monitoring programs.
Figure 6A:
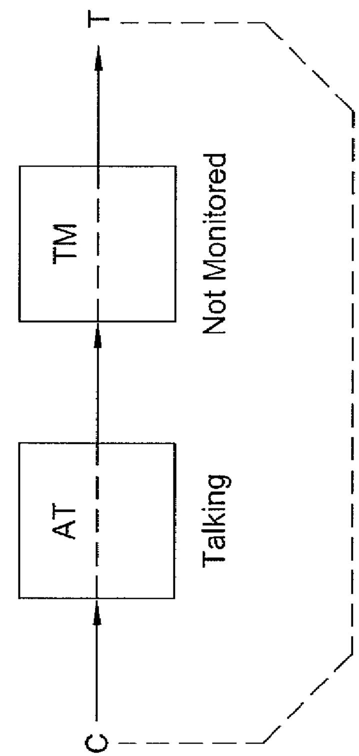

In FIG. 6A, the Attended Transfer program is in its "Talking" state, and the Trainee Monitoring program is in its "Not-Monitored" state. The arrows illustrate dialogs among the customer (C), the trainee (T), and the two programs. The dashed lines within the feature boxes are graphic representations of the links in the feature boxes' current states. The dashed lines outside of the feature boxes represent where there should be an actual audio channel, connecting the endpoint devices along the shortest possible path.

In FIG. 6B, the trainee's supervisor (S) has called in, and the Trainee Monitoring program is now in the "Monitored" state. There is a conference server whose address is "conference" in the Trainee Monitoring program. The links within the Trainee Monitoring program have changed, and the correct media paths have changed along with them. In general, assuming that all endpoint devices want media connection, there should be a media connection between two endpoint devices if and only if there is an unbroken path of dialogs and intra-box links between them.

Figure 6D:
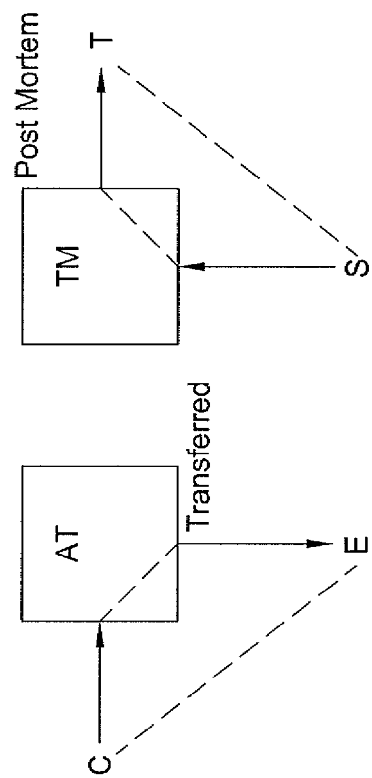
Figure 6C:
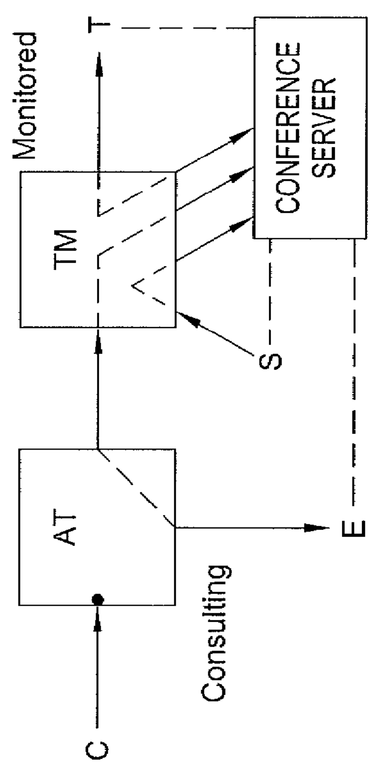

In FIG. 6C, the trainee has clicked "Consult," and the Attended Transfer program is in its "Consulting" state with a new endpoint, the expert (E). The state in the Attended Transfer program has new annotations (the solid dot shows that C is on hold), and the correct media connections have changed with the annotations. This shows clearly that correct media behavior is not determined by one feature, but rather by the composition of both features (i.e., Attended Transfer and Trainee Monitoring). It is noted that the implementation of the Attended Transfer program works concurrently with all dialogs to effect the changes from FIG. 6B to FIG. 6C. If one change at a time was made, the transition would occur much more slowly, and an undesirable intermediate media state might occur.

In FIG. 6D, the trainee has clicked "Transfer," which causes the Attended Transfer program to change media links and end its dialog "t." Because this is the same as the Trainee Monitoring program's dialog "c," the Trainee Monitoring program is now in its "PostMortem" state.

In some embodiments, the media control primitives "link" and "hold" are sufficient for a wide range of applications. State annotation is all that a programmer using the present disclosure needs to do to control media for an application. The implementation of a program generated in accordance with the present disclosure automatically performs compositional media control, so that the actual media channels are correct regardless of how many features are in the signaling path. The implementation also works correctly when the endpoint devices alter media channels by issuing "re-invite" messages.

The implementation of an annotation change works correctly regardless of the state of media signaling when the change occurs. Multiple features and endpoints may be attempting changes concurrently. For instance, a nervous trainee's rapid clicking may initiate a change before a previous change has been completed.

A program generated in accordance with the present disclosure achieves correct compositional media control by hiding from the programmer all messages that carry session descriptions (i.e., the messages in "invite" and "re-invite" transactions). These messages are handled automatically by the program, which performs whatever actions are necessary to match the current state annotations. One exception to this general approach is that the program has access to the non-media aspects of initial "invite" messages, through the operations that create dialogs.

For instance, in the Attended Transfer program, when "t" receives a message causing the dialog to enter the "succeeded" state, the program will send a message with the same semantics to "c," and "c" will also enter the "succeeded" state. This is another result of the link between "t" and "c" in the Attended Transfer program.

Referring back to FIGS. 6A-6D, the order of precedence in governing feature interaction is also illustrated. If the order of the features were reversed, then when the Attended Transfer program was in its "Consulting" state and the Trainee Monitoring program was in its "Monitored" state, the supervisor would not be able to hear or join the conversation between that trainee and the expert. Clearly, the precedence order illustrated in FIGS. 6A-6D causes the features to interact in a better manner.

According to the fourth principle abstraction, "invite" and "re-invite" transactions are used for all media control, including early media.

In SIP, "early media" is media flow occurring before the callee endpoint device has sent a "200 OK" message indicating that the callee is present. Most discussions of early media assume that the source of early media is the same as the source of non-early media (i.e., the callee's endpoint device). Often, however, a media channel is used for control purposes. For example, telephony features use the audio channel for getting information from the caller about how to handle the call, for authenticating the caller (as opposed to authenticating the device that the caller is using), and for informing the caller about the progress of the attempt to reach the callee. None of these early media streams can come from the callee's endpoint device, because the callee's endpoint device has not even received an "invite" message yet.

Early media is a problem in SIP because an initial invite transaction incorporates both negotiation of the first media connection and signaling that the call has succeeded. General purpose early media, as described above, requires separating the two. Embodiments of the present disclosure use "invite" and "re-invite" messages for all media control.

Figure 7:
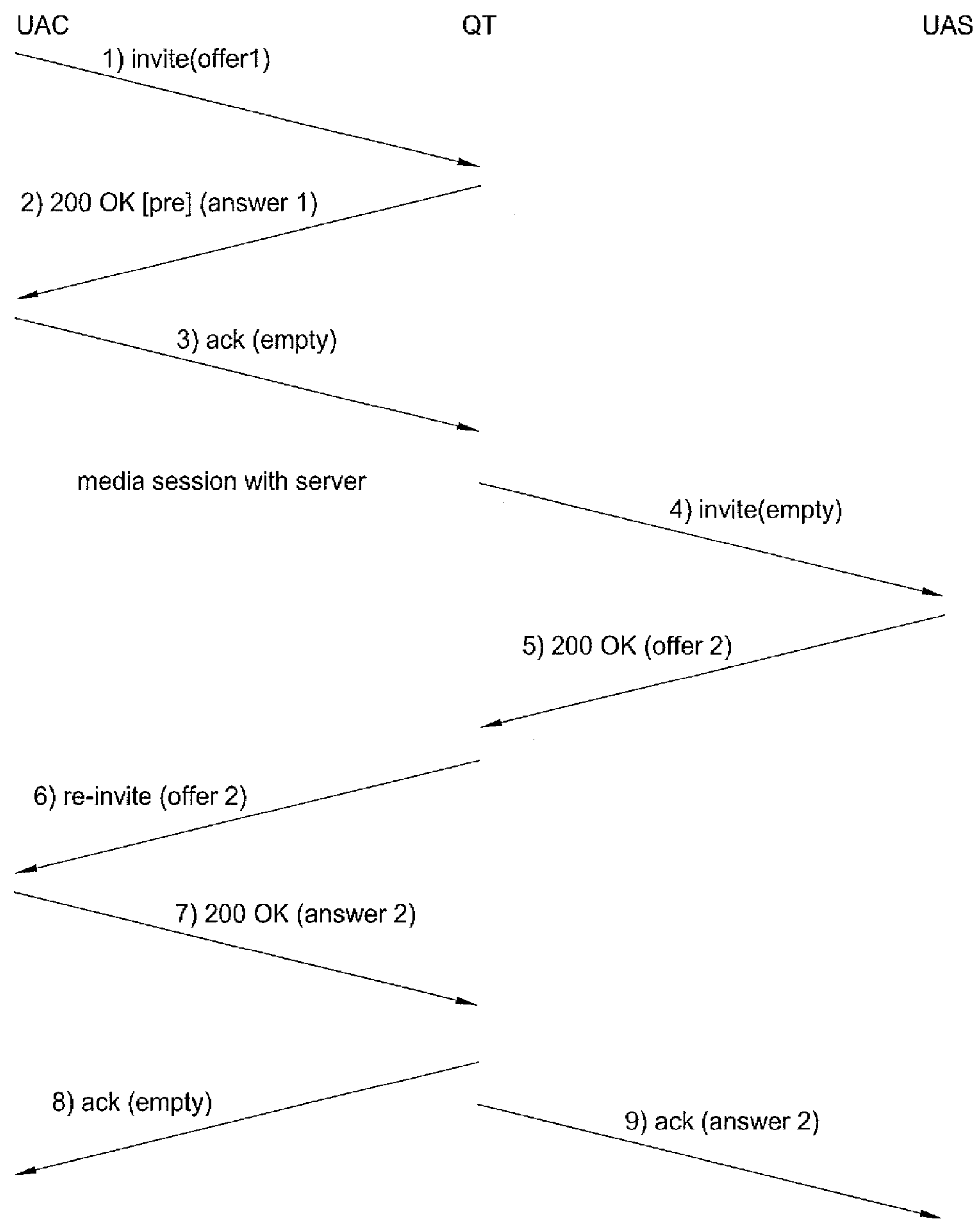
FIG. 7 is a diagram illustrating the signaling among two user agents and a feature box with early media.

For example, FIG. 7 is a diagram illustrating the signaling among two user agents (i.e., a client-side user agent designated as UAC and a server-side user agent designated as UAS) and a feature box (QT) with early media. The exemplary feature box enabled a Quiet Time feature that connects the caller on an incoming call to a media server that implements an interactive voice response session. For instance, the server may announce that the callee wishes not to be disturbed unless the call is urgent, and then prompt the caller to indicate whether the call is urgent or not urgent. If the caller indicates that the call is urgent, then the Quiet Time feature disconnects the media server and places a transparent outgoing call (subsequently becoming permanently transparent). If the caller indicates that the call is not urgent, then the Quiet Time feature sends an "unavail" (unavailable) message upstream, tears down the incoming call, and terminates.

As illustrated in FIG. 7, the Quiet Time program acts as the recipient of the initial "invite" transaction, answering the offer to establish an early media session (messages 1 and 2). The "ack" message is labeled as empty because it has no session description (message 3).

When the early media session is over, if the caller has indicated that the call is urgent, the Quiet Time program solicits a fresh offer from the UAS (messages 4 and 5). Eventually, the UAS receives an answer in the "ack" message that completes the transaction (message 9).

Because the protocol states on the left- and right-hand sides of the diagram are different, the Quiet Time program must continue the rightward "invite" transaction (messages 4, 5, and 9) with a different leftward "re-invite" transaction (messages 6, 7, and 8). These message translations illustrate the fact that programming a SIP back-to-back user agent to act transparently often entails far more work than merely relaying messages from side-to-side. It is also necessary to reformat the session descriptions between the two transactions, because the channel order in the "offer2" message may not match the channel order in "offer1."

With this approach, one problem remains. On receiving message 2, the client-side user agent or any feature between the client-side user agent and the Quiet Time program (e.g., Record Voice Mail (RVM)) thinks that the callee is now present. A human caller will quickly learn the difference, but the Record Voice Mail feature will not, and it will go permanently transparent. However, it is important for composition that the Record Voice Mail feature be triggered by call failure, which is now impossible because a "200 OK" message precludes the failure of the initial "invite" message.

Embodiments of the invention solve this problem by attaching a preliminary tag (pre) to any SIP message that is not meant to convey final success of the initial "invite" transaction (e.g., message 2). This tag decouples status from media signaling. Thus, if the Record Voice Mail feature is to the left of the Quiet Time program in FIG. 7, the "200 OK [pre] (answer1)" message will not make "succeeded" its true dialog, but the subsequent "re-invite" message will.

Figure 8:
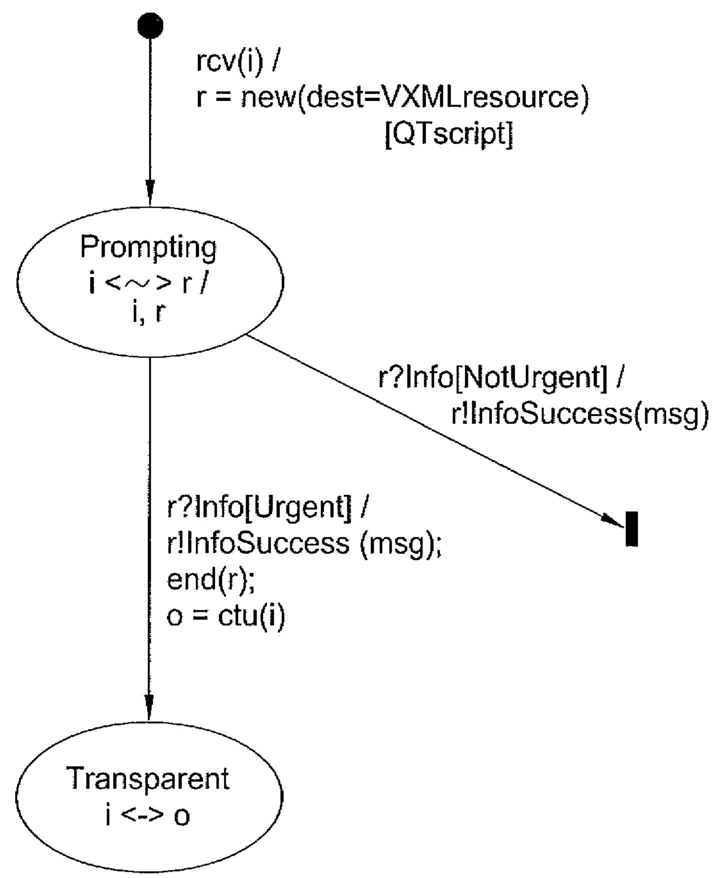
FIG. 8 is a finite state machine illustrating an exemplary embodiment of the Quiet Time feature.

FIG. 8 is a finite state machine illustrating an exemplary embodiment of the Quiet Time feature, discussed above. As illustrated, on receiving an initial "invite" message, the Quiet Time program initiates a new dialog to a VoiceXML server, passing to the server a uniform resource locator (URL) pointing to a script. In the illustrated embodiment, the URL is supplied by the message modifier "[QTscript]." In the "Prompting" state, the VoiceXML server is linked to the caller (note that the Quiet Time program's dialog with the media server is not illustrated in FIG. 7; to give more detail "offer1" is sent to the server, and "answer1" is received from the server). Following the script, the server plays an announcement to the caller and then prompts the caller for an indication (e.g., a touch-tone indication) as to whether the call is urgent. The server returns the results to the Quiet Time program in SIP "info" messages (e.g., in accordance with RFC 2976).

The link inside the "Prompting" state (i.e., "i<~>r") is written with a tilde rather than a hyphen to indicate that the link is a pre-link. A pre-link acts in all respects like a link, except that it does not propagate final success from dialog "r" to dialog "i." The pre-link causes message 2 of FIG. 7 to have the "pre" tag.

If the caller indicates that the call is urgent, then the Quiet Time program continues "i" to "o" and enters a state with a normal link. Because of the normal link, dialog success from the right (message 5, which has no "pre" tag) propagates to the left (message 6, which has no tag).

A normal link propagates, but does not generate, success. If there were another feature with early media to the right of the Quiet Time program, then message 5 and message 6 in FIG. 7 would have "pre" tags.

If the caller indicates that the call is not urgent, then the Quiet Time program transitions to the distinguished terminal state, which is represented graphically by a vertical bar in FIG. 8. An implicit action will end "i" by sending a "bye" message. If the Record Voice Mail program is to the left of the Quiet Time program, the Record Voice Mail program will experience the end of dialog "o" before "o" has succeeded. The Record Voice Mail program interprets this as call failure, and connects the caller with a voicemail server.

Embodiments of the present disclosure include two versions of the state annotation for holding a dialog. If a state is annotated with a dialog variable not linked to another dialog variable but preceded by a tilde, then the annotation is referred to as a "pre-hold." The difference between normal hold and pre-hold is that pre-hold does not generate success. In other words, if there is a transition with the guard "rcv (dialog1)" going into a state in which "dialog1" is held normally, then the implementation responds with a normal "200 OK" message. If a transition with the same guard goes into a state in which "dialog1" is pre-held, then the implementation responds with a "200 OK" message with a "pre" tag.

When programs generated in accordance with the present invention interact with other SIP elements, they receive no "pre" tags, and the "pre" tags they send are ignored.

Thus, the present disclosure employs primitives for active dialogs, compositional media control, and early media to automatically handle the SIP messages involved in creating dialogs, destroying dialogs, and controlling media sessions. These are the request types "invite," "ack," "cancel," and "bye." None of these messages is manipulated directly by a programmer.

Other SIP messages are referred to as "status messages." Embodiments of the present disclosure allow programs to directly access these status messages. At the same time, embodiments of the present disclosure employ mechanisms for dealing with status messages implicitly if desired. These implicit mechanisms are convenient and serve the purpose of enabling well-defined default handling of every message and rendering the programs input-enabled.

Status messages, according to the present disclosure, include, but are not limited to: "Ringing" (or "180"), "Forwarded" (or "181"), "Queued" (or "182"), "Progress" (or "183"), "Info," "InfoSuccess," "InfoFailure," "Options," "OptionsSuccess," and "OptionsFailure." RFC 3261 states that "options" requests and their responses can occur within invite dialogs.

Message types can be used as patterns in guards, with optional predicates, such as "r?Info[Urgent]" in the Quiet Time program. Every constructor for a response type takes as a mandatory argument the message to which it is a response. "msg" is a built-in variable, defined during the execution of a transition as holding the message that triggered the transition.

Status messages can be handled explicitly, as described above. If a status message is not handled explicitly, then implicit mechanisms take over. If a request or an "18x" message is received from a dialog that is linked to another dialog, then implicit handling of the message is forwarded to the other dialog. If a request or an "18x" message is received from a dialog that is held, then implicit handling of the message is saved in a forwarding queue for the held dialog. If two dialogs are newly linked, and one of the dialogs has a non-empty forwarding queue, then the queued messages are immediately forwarded to the other dialog. There is an explicit action to clear the queue at any time, which can be used when immediate forwarding is not appropriate.

Implicit handling of status responses is different, because responses must go to from where the requests came. If a received response corresponds to a request generated by this feature, then the response is dropped. If a received response responds to a request that came from a dialog, and that dialog is still active, then the response is sent to that dialog.

Most of the time, the relationships among active dialogs governing media and status are the same. Dialogs are status-linked or status-held in the same way that they are media-linked or media-held. For those states in which this is not the case, an optional set of state annotations after a slash indicates the status links and holds. For example, referring back to FIG. 8, the "Prompting" state indicates that the two dialogs "i" and "r" are media linked but not status linked, because status message from "i" are intended for the callee and status messages from "r" are intended for the program. If the program proceeds to the "Transparent" state, then all queued messages from "i" will be forwarded to "o.'

Figure 9:
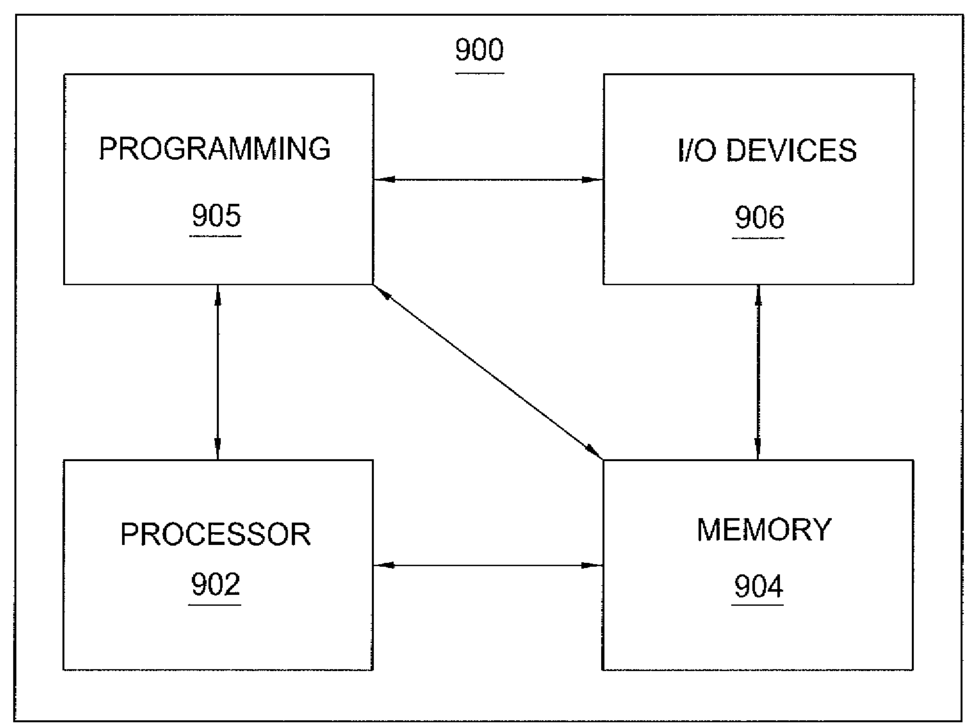
FIG. 9 is a high level block diagram of the programming method that is implemented using a general purpose computing device.

FIG. 9 is a high level block diagram of the programming method that is implemented using a general purpose computing device 900. In one embodiment, a general purpose computing device 900 comprises a processor 902, a memory 904, a programming module 905 and various input/output (I/O) devices 906 such as a display, a keyboard, a mouse, a modem, a stylus, a joystick, a keypad, controller, a sensor, and the like. In one embodiment, at least one I/O device is a storage device (e.g., a disk drive, an optical disk drive, a floppy disk drive). It should be understood that the programming module 905 can be implemented as a physical device or subsystem that is coupled to a processor through a communication channel.

Alternatively, the programming module 905 can be represented by one or more software applications (or even a combination of software and hardware, e.g., using Application Specific Integrated Circuits (ASIC)), where the software is loaded from a storage medium (e.g., I/O devices 906) and operated by the processor 902 in the memory 904 of the general purpose computing device 900. Thus, in one embodiment, the programming module 905 for programming SIP back-to-back user agents described herein with reference to the preceding Figures can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for programming a telecommunication feature, the method comprising:

receiving, by a processor, a source code defining the telecommunication feature, wherein the source code is defined by a user, wherein the source code includes a primitive in a syntax other than a session initiation protocol syntax, the source code using an abstraction that hides from the user session initiation protocol signaling details required by the telecommunication feature, wherein the abstraction uses the primitive to create active session initiation protocol dialogs, the primitive appearing atomic, wherein the primitive implements an operation that establishes an active session initiation protocol dialog without waiting for a final response to an invite, wherein the abstraction includes an implicit transition that forwards a status request from a first dialog to a second dialog, and wherein the abstraction includes an implicit transition that forwards a status response to the first dialog from which the status request is initiated, wherein the abstraction further uses media control primitives including a link media control primitive and a hold media control primitive to perform compositional media control, and wherein session initiation protocol messages involved in creating dialogs, destroying dialogs and controlling media sessions are not directly manipulated by the user; and generating, by the processor, an executable code that causes a session initiation protocol server to execute the telecommunication feature, in accordance with the abstraction.

2. The method of claim 1, where the abstraction views the source code as a finite state machine.

3. The method of claim 1, wherein the primitive includes an implicit transition that rejects unwanted dialogs.

4. The method of claim 1, wherein the primitive includes an implicit transition that ends an active session initiation protocol dialog.

5. The method of claim 1, wherein the abstraction treats a correct media control as a composition of states and goals associated with all features in a signaling path.

6. The method of claim 5, wherein the source code hides from the user all messages carrying session descriptions.

7. The method of claim 1, wherein the abstraction allows a program to directly manipulate a status message.

8. The method of claim 1, wherein the executable code is input-enabled.

9. The method of claim 1, wherein the abstraction employs invite and re-invite transactions for all media control.

10. The method of claim 1, wherein the executable code attaches a preliminary tag to any session initiation protocol message that is not meant to convey a final success of an initial invite transaction, the preliminary tag decoupling a status of a session initiation protocol from media signaling.

11. A non-transitory computer readable storage medium storing a plurality of instructions which, when executed by a processor, causes the processor to perform operations for programming a telecommunication feature, the operations comprising:

receiving a source code defining the telecommunication feature, wherein the source code is defined by a user, wherein the source code includes a primitive in a syntax other than a session initiation protocol syntax, the source code using an abstraction that hides from the user session initiation protocol signaling details required by the telecommunication feature, wherein the abstraction uses the primitive to create active session initiation protocol dialogs, the primitive appearing atomic, wherein the primitive implements an operation that establishes an active session initiation protocol dialog without waiting for a final response to an invite, wherein the abstraction includes an implicit transition that forwards a status request from a first dialog to a second dialog, and wherein the abstraction includes an implicit transition that forwards a status response to the first dialog from which the status request is initiated, wherein the abstraction further uses media control primitives including a link media control primitive and a hold media control primitive to perform compositional media control, and wherein session initiation protocol messages involved in creating dialogs, destroying dialogs and controlling media sessions are not directly manipulated by the user; and generating an executable code that causes a session initiation protocol server to execute the telecommunication feature, in accordance with the abstraction.

12. The non-transitory computer readable storage medium of claim 11, where the abstraction views the source code as a finite state machine.

13. The non-transitory computer readable storage medium of claim 11, wherein the primitive includes an implicit transition that ends an active session initiation protocol dialog.

14. The non-transitory computer readable storage medium of claim 11, wherein the abstraction treats a correct media control as a composition of states and goals associated with all features in a signaling path.

15. The non-transitory computer readable storage medium of claim 11, wherein the abstraction allows the program to directly manipulate a status message.

16. A system for programming a telecommunication feature, the system comprising:

a processor; and a computer-readable medium storing a plurality of instructions which, when executed by the processor, cause the processor to perform operations, the operations comprising:

receiving a source code defining the telecommunication feature, wherein the source code is defined by a user, wherein the source code includes a primitive in a syntax other than a session initiation protocol syntax, the source code using an abstraction that hides from the user session initiation protocol signaling details required by the telecommunication feature, wherein the abstraction uses the primitive to create active session initiation protocol dialogs, the primitive appearing atomic, wherein the primitive implements an operation that establishes an active session initiation protocol dialog without waiting for a final response to an invite, wherein the abstraction includes an implicit transition that forwards a status request from a first dialog to a second dialog, wherein the abstraction includes an implicit transition that forwards a status response to the first dialog from which the status request is initiated, wherein the abstraction further uses media control primitives including a link media control primitive and a hold media control primitive to perform compositional media control, and wherein session initiation protocol messages involved in creating dialogs, destroying dialogs and controlling media sessions are not directly manipulated by the user; and generating an executable code that causes a session initiation protocol server to execute the telecommunication feature, in accordance with the abstraction.

17. The non-transitory computer readable storage medium of claim 11, wherein the primitive includes an implicit transition that rejects unwanted dialogs.

* * * * *